United States Patent Office 3,096,989
Patented July 9, 1963

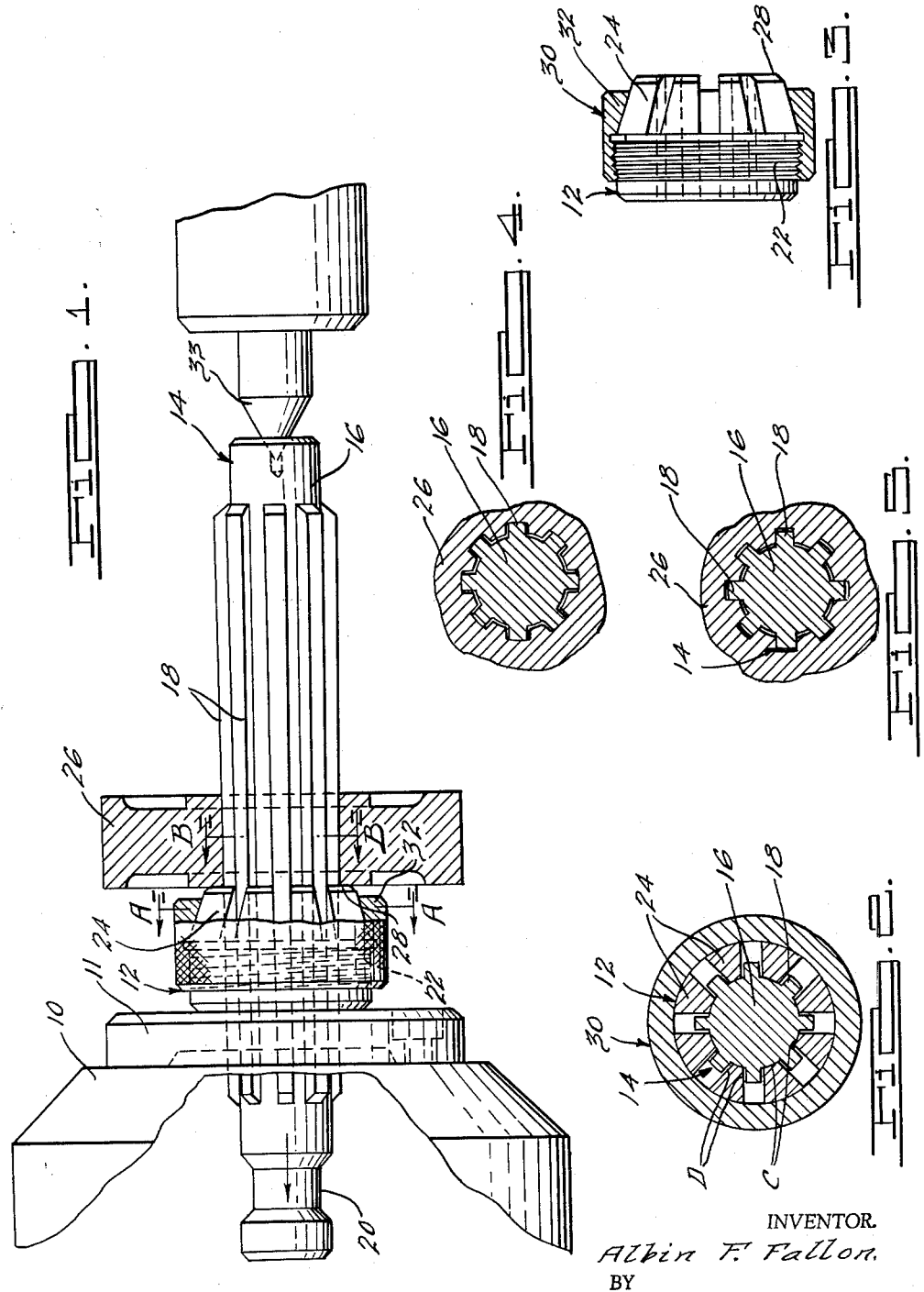

3,096,989
ARBOR SECURING DEVICE
Albin F. Fallon, Grosse Pointe Shores, Mich.
(Apt. No. 1502, Horizon House, Clearwater, Fla.)
Filed June 4, 1962, Ser. No. 199,881
6 Claims. (Cl. 279—48)

This invention related generally to arbors and, more particularly, to an arbor securing device for internally splined workpieces and the like.

Arbors as heretofore constructed tend to use radically tapered pull-in expanders or outwardly expanding arbor fingers to maintain a workpiece in a secure position for machining or inspection procedures. Employment of these devices frequently caused an uneven application of pressure which resulted in undesired pressure markings on the bore of the workpiece. Arbors of this character had the further shortcoming of failure to maintain with the requisite degree of accuracy the concentricity of the arbor relative to the workpiece whereby they are held to a rigidly preset position.

My invention is particularly effective to overcome these difficulties so that the greatest possible accuracy in centering and securing the workpiece may be attained.

Accordingly, it is an object of this invention to provide an improved arbor and arbor securing device whereby a workpiece may be centered and secured from both radial and axial displacement on the arbor.

It is a further object of this invention to provide an arbor having an improved locking device incorporated thereon for maintaining the workpiece against axial movement and the arbor from rotation from a set position.

In conformance with the above mentioned objects, my invention, first briefly described, includes a tapered arbor having a plurality of similarly tapered spline projections extending toward the pilot end of the arbor and engageable with the internal spline of a workpiece. A collet is journalled on the arbor between the pilot end thereof and the workpiece and has a plurality of deflectable teeth inwardly extending toward the spline projections on the arbor and with their end portions in engagement with the workpiece. A locking means herein embodied as a threaded locking member is threadably engaged with the collet and adapted to bear against its deflectable teeth to compress them into engagement with the splined projections of the arbor. The collet and the arbor are then mounted between centers or between a rotative drive member and a center, respectively.

With the above stated object and statement of the invention in view, the invention resides in the novel construction, cooperative arrangement, and formation of parts as will be hereinafter more specifically described and illustrated in the accompanying drawings, in which:

FIGURE 1 is an elevation of the present inventive device as incorporated in a machine spindle nose with parts broken away to better illustrate its mode of operation;

FIGURE 2 is a cross sectional view taken on the line A—A of FIGURE 1, looking in the direction of the arrows;

FIGURE 3 is a detail, side elevation view of the collet utilized;

FIGURE 4 is a cross sectional view taken on the line B—B of FIGURE 1; and

FIGURE 5 is a view similar to FIGURE 4 showing an alternate mounting of the workpiece.

Similar characters of reference indicate similar parts in the several figures of the drawings.

With reference to FIGURE 1, the present invention is shown incorporated in a machine spindle nose 10. Coupled to spindle nose 10 through a collet adaptor 11 is a collet 12. Slidably mounted through collet 12 is an arbor 14 which comprises a central shaft 16 slightly tapered from its right hand end to its left hand or pilot end. A plurality of spline projections 18 are formed integrally with central shaft 16 and extend along the greater length of the shaft. Proximate the pilot end of shaft 16 is a shank 20 adapted to be engaged and pulled leftwardly either manually or by a mechanical puller, not shown, in a manner well known in the art. Collet 12 is further shown to have a left hand threaded portion 22 and a plurality of inwardly projecting teeth 24, in the present embodiment eight in number and equal in number to the number of spline projections 18 formed on arbor 14. A workpiece 26 here shown as a gear blank is further shown mounted on arbor 14 and having its left side in abutment with end portions 28 of teeth 24 of collet 12. An internally threaded locking member 30 is shown threadably engaging the threaded portion 22 of collet 12. Locking member 30 further has an internal tapered portion 32 bearing against the outer peripheries of teeth 24 on collet 12. A tail center 33 is further provided for support at the right hand end of arbor 14.

FIGURE 2 shows a section of FIGURE 1 along line A—A and indicates the positive locking engagement whereby collet teeth 24 are compressed into contact with the root diameter portions identified by the reference letter C between splines 18 on arbor 14. It will be appreciated that FIGURE 2 illustrates but one of several alternate embodiments of the present invention which will be further explained in connection with FIGURES 4 and 5 hereinafter. Also shown in FIGURE 2 is the outer periphery of the end of locking member 30 which, it will be recalled, has an internal tapered portion better shown in FIGURE 3 for the purpose of compressing the teeth 24 into engagement with spline projections 18 of arbor 14.

FIGURE 3 is a detail view of the collet 12 illustrating the cooperative relationship that it has with locking member 30.

FIGURE 4 shows one manner of location of the workpiece 26 on the major diameter of arbor 14. More specifically, it shows the internally formed spline of the workpiece limiting against the outer peripheral portions of spline projections 18. If it is desired to locate the workpiece in this manner, the concentricity of arbor 14 may be maintained by engaging the collet teeth 24 with the root diameter portions of arbor 14 after the manner of FIGURE 2 or with the side portions of the teeth 24 as indicated by the reference letter D in FIGURE 2, or from both by the selective shaping and sizing of teeth 24.

FIGURE 5 illustrates a second manner of locating the workpiece 26 on the tapered pitch diameter portion of arbor 14. More specifically, it shows the internally formed splines of the workpiece limiting against the sides of spline projections 18. If this manner of mounting the workpiece is selected, the concentricity of arbor 14 may be maintained by engaging the collet teeth 24 with the root diameter portions C of arbor 14 after the manner of FIGURE 2 or with the side portions D of splines 18 of arbor 14, or from the major diameter of the spline projections 18.

From the foregoing description of the several figures it will be seen that the present invention provides an arbor securing device which provides a positive concentricity assuring arrangement with great versatility and variety of applications. In operation a sequence already indicated by the drawings is followed. The workpiece 26 is placed on the arbor 14. The arbor 14 is then inserted leftwardly through the open collet 12 and the spindle nose 10. The arbor 14 is then seated firmly in the workpiece by a mechanical or manual means. By the same action, the workpiece is seated firmly against the end portions 28 of teeth 24 of collet 12. A force of compression is then applied through locking member 30 by threading it leftwardly on collet 12 so that its tapered portion 32 bears against teeth 28 bringing them into the predetermined locking arrangement with spline projections 18 on arbor 14. It will be further appreciated that the workpiece 26 is maintained against longitudinal movement on arbor 14, not only by reason of its internal tapered surface engagement with the arbor 14 but also by the rightwardly directed forces from collet 12 against the workpiece.

It will thus be seen that the present invention provides a secure locking device for an internally splined workpiece with an accuracy and durability of construction limited only by the surface wear of the parts. It will be appreciated that carbide inserts may be incorporated where required in both the arbor and collet. The type of arbor securing device hereinbefore described will accommodate production and inspection operations over a broad range of spline diameters particularly in small spline diameters for which adjustable arbors would not function. Various changes in details can be made without departing from the scope and spirit of my invention.

I claim as my invention:

1. A device for securing an internally splined workpiece to a rotatable drive member comprising an arbor having a plurality of splined projections tapered toward a pilot end thereof, and engageable with the internally splined workpiece, a collet fixed to said rotatable drive member and having a plurality of deflectable teeth extending toward engagement with said arbor intermediate its said spline projections, and means operatively connected to said collet and operable to compress its teeth into engagement with the root diameter portions of said arbor intermediate its spline projections.

2. A device for securing an internally splined workpiece to a rotatable drive member comprising an arbor having a plurality of spline projections tapered toward a pilot end thereof and engageable with the internally splined workpiece, a collet fixed to said rotatable drive member and having a plurality of deflectable teeth extending toward engagement with said arbor, and means operatively connected to said collet and operable to compress its teeth into engagement with the side surfaces of said projections and with the root diameter portions therebetween.

3. A device for securing an internally splined workpiece to a rotatable drive member comprising an arbor having a plurality of spline projections uniformly tapered toward a pilot end thereof and engageable with the internally splined workpiece, a collet fixed to said rotatable drive member, said collet having an axial bore containing said arbor and a plurality of deflectable teeth extending toward said arbor intermediate its said spline projections, each of said deflectable teeth having an abutment portion engageable with the workpiece at its side proximate the pilot end of said arbor, and means operatively connected to said collet and operable to compress its teeth into engagement with the root diameter portions of said arbor intermediate its spline projections.

4. A device for securing an internally splined workpiece to a rotatable drive member comprising an arbor having a plurality of spline projections tapered toward a pilot end thereof and engageable with the teeth of the internally splined workpiece, a collet fixed to said rotatable drive member and mounted on said arbor on the pilot end side of the workpiece, said collet having a plurality of deflectable teeth extending toward said arbor intermediate its said spline projections, each of said deflectable teeth having an abutment end portion engageable with the side of the workpiece, and means operatively connected to said collet and operable to compress its teeth into engagement with the side surfaces of said spline projections of said arbor.

5. A device for securing an internally splined workpiece to a rotatable drive member comprising a tapered arbor having a plurality of equally spaced, longitudinally formed spline projections similarly tapered toward a pilot end thereof and engageable with the teeth of the internally splined workpiece, a collet fixed to said rotatable drive member and mounted on said arbor intermediate said pilot end thereof and the workpiece, said collet having an external threaded portion at one end and a plurality of deflectable teeth extending inwardly toward said arbor intermediate its said spline projections, each of said teeth having a tapered outside surface portion and an abutment end portion engageable with the side of the workpiece, and an internally threaded locking member threadably engageable with said threaded portion of said collet and having an internal tapered portion engageable with said tapered outside surface portion of said collet teeth whereby said teeth are compressed into locking engagement with the root diameter portions of said arbor intermediate its spline projections.

6. A positive locking apparatus for mounting an internally splined member between centers comprising an arbor having a plurality of equally spaced, longitudinally formed spline projections tapered toward a pilot end and engageable with the teeth of the internally splined member, a collet having an axial bore containing said arbor with said arbor being movable therethrough, said collet having an external threaded portion at one end and a plurality of deflectable teeth extending inwardly toward said arbor and registerable intermediate its said spline projections, each of said teeth having a tapered outside portion and an abutment end portion engageable with the side of the internally splined member, and an internally threaded locking member threadably engageable with said threaded portion of said collet and having an internal tapered portion engageable with said tapered outside surface portions of said collet teeth whereby said teeth are compressed into locking engagement intermediate said spline projections of said arbor.

No references cited.